United States Patent
Mamtani et al.

(10) Patent No.: US 8,979,655 B2
(45) Date of Patent: Mar. 17, 2015

(54) SYSTEM AND METHOD FOR SECURELY HOSTING APPLICATIONS

(75) Inventors: Vinod Mamtani, San Jose, CA (US); Brett McLarnon, Mountain View, CA (US); Jay Markello, Millbrae, CA (US); Scott Heath, San Anselmo, CA (US)

(73) Assignee: OL2, Inc., Mountain View, CA (US)

( * ) Notice: Subject to any disclaimer, the term of this patent is extended or adjusted under 35 U.S.C. 154(b) by 507 days.

(21) Appl. No.: 13/232,990

(22) Filed: Sep. 14, 2011

(65) Prior Publication Data

US 2012/0124573 A1    May 17, 2012

Related U.S. Application Data

(63) Continuation-in-part of application No. 12/538,077, filed on Aug. 7, 2009, and a continuation-in-part of application No. 10/315,460, filed on Dec. 10, 2002, now Pat. No. 7,849,491.

(60) Provisional application No. 61/210,888, filed on Mar. 23, 2009.

(51) Int. Cl.
*A63F 13/30* (2014.01)
*H04N 19/169* (2014.01)
(Continued)

(52) U.S. Cl.
CPC .......... *A63F 13/12* (2013.01); *H04N 19/00327* (2013.01); *H04N 21/233* (2013.01); *H04N 21/2343* (2013.01); *H04N 21/2381* (2013.01); *H04N 21/26613* (2013.01); *H04N 21/4781* (2013.01); *H04N 21/6125* (2013.01); *H04N 21/6377* (2013.01); *H04N 21/6405* (2013.01); *H04N 21/658* (2013.01);
(Continued)

(58) Field of Classification Search
None
See application file for complete search history.

(56) References Cited

U.S. PATENT DOCUMENTS 5,558,339 A    9/1996 Perlman
5,872,575 A    2/1999 Segal
(Continued)

FOREIGN PATENT DOCUMENTS

WO    2008054997 A2    5/2008

OTHER PUBLICATIONS

International Search Report and Written Opinion from counterpart PCT Patent Application No. PCT/US12/55241 mailed Jan. 22, 2013, 15 pages.
(Continued)

*Primary Examiner* — Paul A D'Agostino
*Assistant Examiner* — Ankit Doshi
(74) *Attorney, Agent, or Firm* — Blakely, Sokoloff, Taylor & Zafman LLP

(57) ABSTRACT

A computer-implemented system for providing a virtualized application hosting environment comprising: a plurality of application/game servers each having a memory for storing application program code and data and a processor for executing the application program code and processing the data on behalf of a client; a virtualization service executed on each of the application/game servers, the virtualization service comprising a file redirection module for redirecting file read/write operations generated by the application program code to one or more virtualized file locations; and a registry redirection module for intercepting registry operations generated by the application program code and executing the registry operations on behalf of the application program code at one or more virtualized registry locations.

21 Claims, 11 Drawing Sheets

(51) Int. Cl.

| | | |
|---|---|---|
| *H04N 21/233* | (2011.01) | |
| *H04N 21/2343* | (2011.01) | |
| *H04N 21/2381* | (2011.01) | |
| *H04N 21/266* | (2011.01) | |
| *H04N 21/478* | (2011.01) | |
| *H04N 21/61* | (2011.01) | |
| *H04N 21/6377* | (2011.01) | |
| *H04N 21/6405* | (2011.01) | |
| *H04N 21/658* | (2011.01) | |
| *H04N 21/6587* | (2011.01) | |
| *H04N 19/146* | (2014.01) | |
| *H04N 19/164* | (2014.01) | |
| *H04N 19/132* | (2014.01) | |
| *H04N 19/107* | (2014.01) | |
| *H04N 19/172* | (2014.01) | |
| *H04N 19/61* | (2014.01) | |
| *H04N 19/436* | (2014.01) | |
| *H04L 29/06* | (2006.01) | |

(52) U.S. Cl.
CPC .... *H04N 21/6587* (2013.01); *H04N 19/00169* (2013.01); *H04N 19/00236* (2013.01); *H04N 19/00127* (2013.01); *H04N 19/0003* (2013.01); *H04N 19/00266* (2013.01); *H04N 19/00781* (2013.01); *H04N 19/00521* (2013.01); *H04L 65/605* (2013.01); *H04L 65/4076* (2013.01); *H04L 65/403* (2013.01); *H04L 67/38* (2013.01); *A63F 2300/402* (2013.01); *A63F 2300/407* (2013.01); *A63F 2300/534* (2013.01); *A63F 2300/552* (2013.01); *A63F 2300/554* (2013.01); *A63F 2300/556* (2013.01); *A63F 2300/572* (2013.01); *A63F 2300/577* (2013.01); *A63F 2300/636* (2013.01); *A63F 2300/69* (2013.01)
USPC .............................. 463/40; 709/217; 345/422

(56) References Cited

U.S. PATENT DOCUMENTS

| | | | |
|---|---|---|---|
| 6,110,041 A | | 8/2000 | Walker et al. |
| 6,438,594 B1 * | | 8/2002 | Bowman-Amuah .......... 709/225 |
| 6,466,248 B1 | | 10/2002 | Spann et al. |
| 6,715,145 B1 * | | 3/2004 | Bowman-Amuah .......... 718/101 |
| 6,721,260 B2 | | 4/2004 | Mauro et al. |
| 6,810,528 B1 | | 10/2004 | Chatani |
| 7,016,419 B2 | | 3/2006 | Tardif |
| 7,089,319 B2 | | 8/2006 | Lysenko et al. |
| 7,359,004 B2 | | 4/2008 | Yu et al. |
| 7,430,187 B2 | | 9/2008 | Holt et al. |
| 7,461,161 B2 | | 12/2008 | Horiguchi |
| 7,587,520 B1 | | 9/2009 | Kent et al. |
| 7,680,038 B1 | | 3/2010 | Gourlay |
| 2002/0004838 A1 | | 1/2002 | Hakenberg |
| 2002/0010700 A1 * | | 1/2002 | Wotring et al. ............... 707/100 |
| 2002/0128065 A1 | | 9/2002 | Chung et al. |
| 2002/0156870 A1 * | | 10/2002 | Boroumand et al. ......... 709/219 |
| 2003/0009535 A1 | | 1/2003 | Apostolopulos |
| 2004/0111755 A1 | | 6/2004 | Perlman |
| 2004/0114576 A1 | | 6/2004 | Itoh et al. |
| 2006/0029055 A1 | | 2/2006 | Fellman |
| 2006/0069662 A1 | | 3/2006 | Laborczfalvi et al. |
| 2006/0078046 A1 | | 4/2006 | Lu |
| 2006/0078051 A1 | | 4/2006 | Liang et al. |
| 2006/0116208 A1 | | 6/2006 | Chen et al. |
| 2006/0136569 A1 | | 6/2006 | Tenhunen et al. |
| 2006/0146830 A1 | | 7/2006 | Lin et al. |
| 2006/0148571 A1 | | 7/2006 | Hossack et al. |
| 2006/0150055 A1 | | 7/2006 | Quinard et al. |
| 2006/0154710 A1 | | 7/2006 | Serafat |
| 2006/0230428 A1 | | 10/2006 | Craig et al. |
| 2006/0277248 A1 | | 12/2006 | Baxter et al. |
| 2007/0009029 A1 | | 1/2007 | Craig et al. |
| 2007/0025631 A1 | | 2/2007 | Kim et al. |
| 2007/0073779 A1 | | 3/2007 | Walker et al. |
| 2007/0147514 A1 | | 6/2007 | Yamaguchi et al. |
| 2007/0183493 A1 | | 8/2007 | Kimpe |
| 2007/0260492 A1 | | 11/2007 | Feied et al. |
| 2007/0271358 A1 | | 11/2007 | Gaddy |
| 2008/0032794 A1 | | 2/2008 | Ware et al. |
| 2008/0045338 A1 | | 2/2008 | Walker et al. |
| 2008/0207322 A1 | | 8/2008 | Mizrahi |
| 2008/0247463 A1 | | 10/2008 | Buttimer et al. |
| 2009/0003452 A1 | | 1/2009 | Au et al. |

OTHER PUBLICATIONS

Office Action from U.S. Appl. No. 12/538,086, mailed Oct. 7, 2010), 10 pages.
Office Action from U.S. Appl. No. 12/538,076 mailed Oct. 12, 2011, 7 pages.
Office Action from U.S. Appl. No. 12/538,077 mailed Aug. 12, 2011, 7 pages.
Final Office Action from U.S. Appl. No. 12/538,077, mailed Jun. 19, 2013, 19 page.
IDS and characterization of references submitted by Inventor in related applications, 7 pages, May 24, 2013.
Office Action from U.S. Appl. No. 13/232,981, mailed Nov. 19, 2013, 11 pages.
Frauenfelder, M., "G-Cluster Makes Games to Go", The Feature: It's All About the Mobile Internet, http://www.thefeaturearchives.com/13267.html, 3 pages, Nov. 6, 2001.
Office Action from U.S. Appl. No. 12/538,077, mailed Mar. 25, 2014, 33 pages.
Final Office Action from U.S. Appl. No. 13/232,981, mailed Mar. 25, 2014, 12 pages.
Notification Concerning Transmittal of International Preliminary Report on Patentability from counterpart PCT Patent Application No. PCT/US12/55241 mailed Mar. 27, 2014, 11 pages.
Setton, E , et al., "Peer-to-Peer Live Multicast: A Video Perspective," Proceedings of the IEEE, vol. 96 Issue: 1, [retrieved May 5, 2010 ] retrieved from the Internet. <URL: http://ieeexplore.ieee.org/Xplore/login.jsp?reload=true&url=http%3A %2F%2Fieeexplo, (Jan. 2008), 25-38 pages.

* cited by examiner

SYSTEM AND METHOD FOR SECURELY HOSTING APPLICATIONS

This application is a continuation-in-part of U.S. patent application Ser. No. 12/538,077, filed Aug. 7, 2009, entitled SYSTEM AND METHOD FOR ACCELERATED MACHINE SWITCHING, which claims priority to U.S. Provisional Application Ser. No. 61/210,888, filed, Mar. 23, 2009, and is a continuation-in-part (CIP) application of Ser. No. 10/315,460 filed Dec. 10, 2002 now U.S. Pat. No. 7,849,491 entitled, "APPARATUS AND METHOD FOR WIRELESS VIDEO GAMING", which is assigned to the assignee of the present CIP application.

TECHNICAL FIELD

The present disclosure relates generally to the field of data processing systems and particularly to a virtualization and encryption system and method for hosting applications.

BACKGROUND

"Virtualization" generally refers to the use of a virtual (rather than actual) version of something, such as a hardware platform, operating system, a storage device or network resources. Platform virtualization relies on the creation of a "virtual machines" which behave like a real computer with an operating system. Software executed on these virtual machines are separated from the underlying hardware resources. For example, a computer that is running Mac OS X may host a virtual machine such as Parallels™ or VMWare Fusion™ that looks like a computer to the Windows operating system. Once installed in Mac OS X, Windows-based applications can be run on that virtual machine.

Most Windows-based applications must be installed before execution. The installation process copies application binaries and data files to some fixed locations in Windows, updates the registry keys and values for that application and establishes run-time dependencies on assemblies and system components. In addition, an application execution results in generation of new files and run time modification of existing files in Windows. Consequently, a virtual machine implementation for Windows requires a complex set of program code and consumes significant processing resources when translating between Windows-based modules and native software modules. Running such a virtualized environment on a hosting service for multiple online users, tracking file and registry updates and providing sufficient security in an efficient, cost-effective manner is a difficult task.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the present disclosure. However, persons having ordinary skill in the relevant arts will appreciate that these specific details may not be needed to practice the embodiments described.

The assignee of the present application has developed an online video gaming and application hosting system. Certain embodiments of this system are described, for example, in U.S. patent application Ser. No. 12/538,077, filed Aug. 7, 2009, entitled SYSTEM AND METHOD FOR ACCELERATED MACHINE SWITCHING (hereinafter '077 application) which claims priority to U.S. Provisional Application Ser. No. 61/210,888, filed, Mar. 23, 2009, and is a continuation-in-part (CIP) application of Ser. No. 10/315,460 filed Dec. 10, 2002 entitled, "APPARATUS AND METHOD FOR WIRELESS VIDEO GAMING", which is assigned to the assignee of the present CIP application. These applications are sometimes referred to as the "co-pending applications" and are incorporated herein by reference. A brief description of certain pertinent aspects of the online video game and application hosting system described in the co-pending applications will now be provided, following by a detailed description of a virtualization and encryption system and method for hosting applications.

An Exemplary Online Video Game and Application Hosting System

Figure 1:
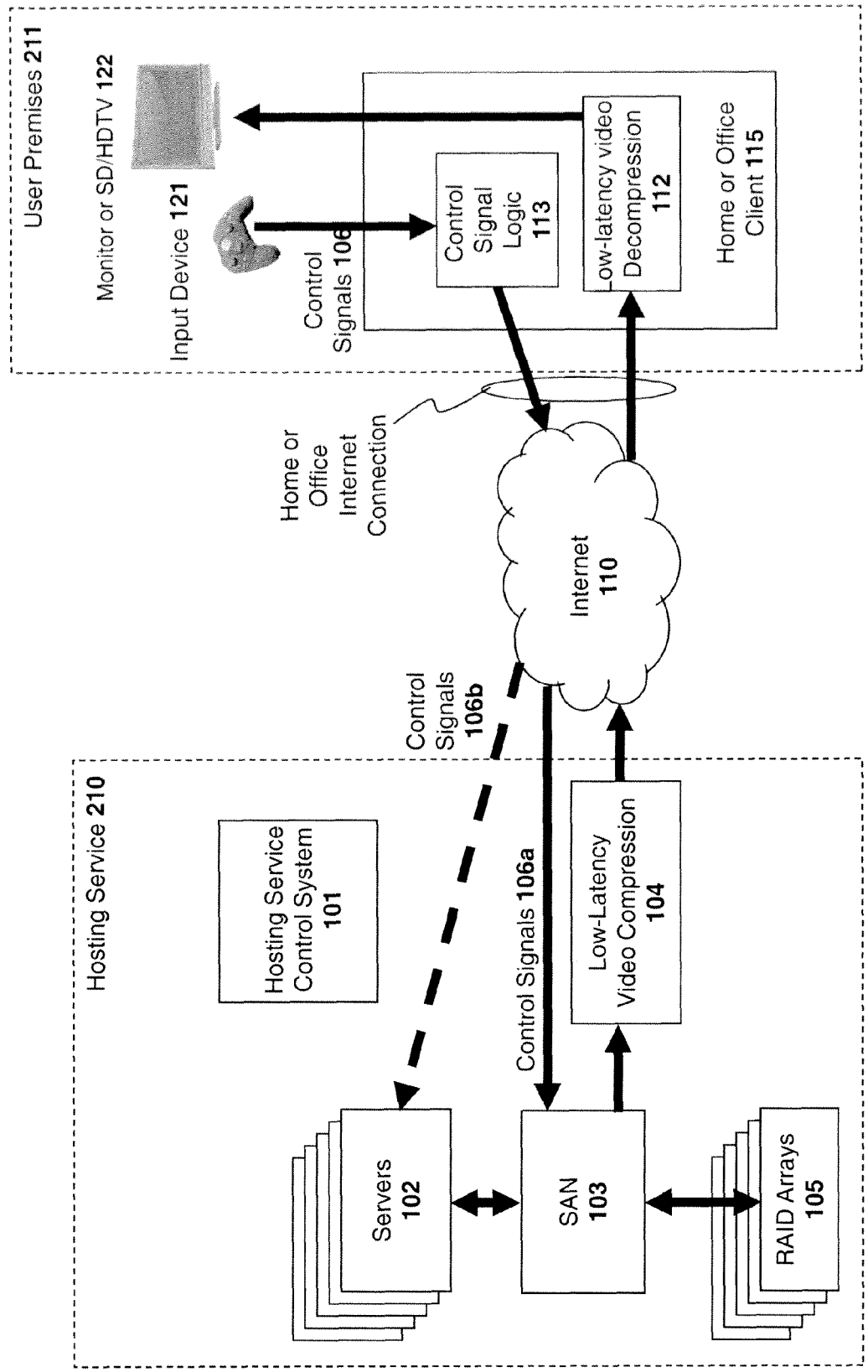
FIG. 1 illustrates a system architecture for executing online video games according to one embodiment of the invention.

FIG. 1 illustrates one embodiment of a video game/application hosting service 210 described in the co-pending applications. The Hosting Service 210 hosts applications running on Servers 102, that accept input from an Input device 121, received by Home or Office Client 115, and sent through the Internet 110 to Hosting Service 210. The Servers 102 are responsive to the input, and update their video and audio output accordingly which is compressed through Low-Latency Video Compression 104. The compressed video is then streamed through the Internet 110 to be decompressed by the Home or Office Client 115, and then displayed on Monitor or SD/HDTV 122. This system is an low-latency streaming interactive video system as more thoroughly described in the aforementioned "co-pending applications."

Figure 2:
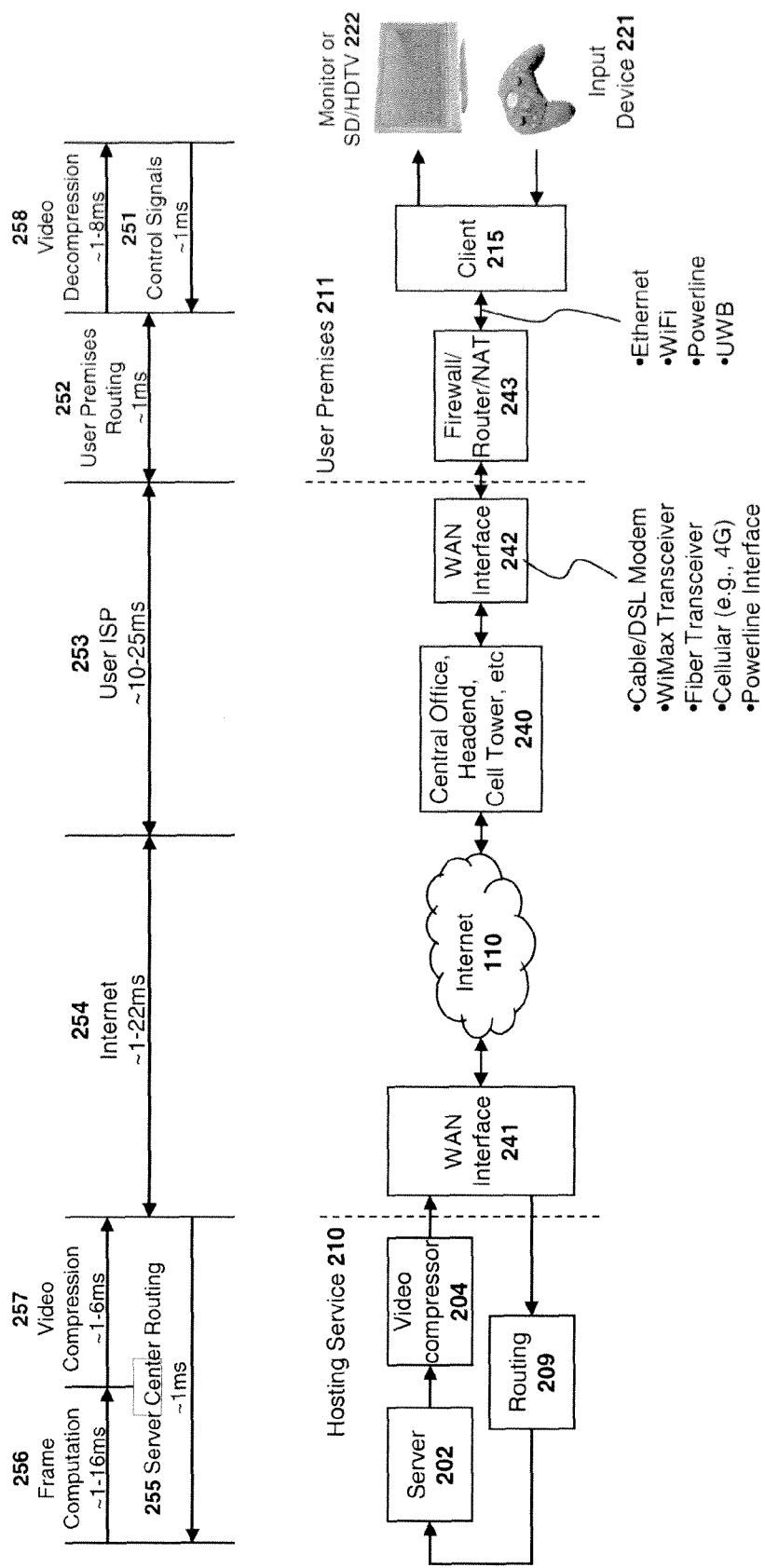
FIG. 2 illustrates different communication channels over which an online video game may be played in accordance with one embodiment of the invention.

As shown in FIG. 2, the network connection between the Hosting Service 210 Home and Office Client 215 may be implemented through a wide range of network technologies, of varying degrees of reliability, such as wired or optical fiber technologies that are typically more reliable and wireless technologies that may be subject to unpredictable interference or range limitations (e.g. Wi-Fi) and are typically less reliable. Any of these client devices may have their own user input devices (e.g., keyboards, buttons, touch screens, track pads or inertial-sensing wands, video capture cameras and/or motion-tracking cameras, etc.), or they may use external input devices 221 (e.g., keyboards, mice, game controllers, inertial sensing wand, video capture cameras and/or motion tracking cameras, etc.), connected with wires or wirelessly. As described in greater detail below, the hosting service 210 includes servers of various levels of performance, including those with high-powered CPU/GPU processing capabilities. During playing of a game or use of an application on the hosting service 210, a home or office client 215 receives keyboard and/or controller input from the user, and then it transmits the controller input through the Internet 110 to the hosting service 210 that executes the gaming program code in response and generates successive frames of video output (a sequence of video images) for the game or application software (e.g., if the user presses a button which would direct a character on the screen to move to the right, the game program would then create a sequence of video images showing the character moving to the right). This sequence of video images is then compressed using a low-latency video compressor, and the hosting service 210 then transmits the low-latency video stream through the Internet 110. The home or office client device 215 then decodes the compressed video stream and renders the decompressed video images on a monitor or TV 222. Consequently, the computing and graphical hardware requirements of the client 215 are significantly reduced. The client 215 only needs to have the processing power to forward the keyboard/controller input to the Internet 110 and decode and decompress a compressed video stream received from the Internet 110, which virtually any personal computer is capable of doing today in software on its CPU (e.g., a Intel Corporation Core Duo CPU running at approximately 2 GHz is capable of decompressing 720p HDTV encoded using compressors such as H.264 and Windows Media VC9). And, in the case of any client devices, dedicated chips can also perform video decompression for such standards in real-time at far lower cost and with far less power consumption than a general-purpose CPU such as would be required for a modern PC. Notably, to perform the function of forwarding controller input and decompressing video, home client devices 215 do not require any specialized graphics processing units (GPUs), optical drive or hard drives.

As games and applications software become more complex and more photo-realistic, they will require higher-performance CPUs, GPUs, more RAM, and larger and faster disk drives, and the computing power at the hosting service 210 may be continually upgraded, but the end user will not be required to update the home or office client platform 215 since its processing requirements will remain constant for a display resolution and frame rate with a given video decompression algorithm. Thus, the hardware limitations and compatibility issues seen today do not exist in the system illustrated in FIGS. 1-3.

Further, because the game and application software executes only in servers in the hosting service 210, there never is a copy of the game or application software (either in the form of optical media, or as downloaded software) in the user's home or office ("office" as used herein unless otherwise qualified shall include any non-residential setting, including, schoolrooms, for example). This significantly mitigates the likelihood of a game or application software being illegally copied (pirated), as well as mitigating the likelihood of a valuable database that might be use by a game or applications software being pirated. Indeed, if specialized servers are required (e.g., requiring very expensive, large or noisy equipment) to play the game or application software that are not practical for home or office use, then even if a pirated copy of the game or application software were obtained, it would not be operable in the home or office.

In one embodiment, the hosting service 210 provides software development tools to the game or application software developers (which refers generally to software development companies, game or movie studios, or game or applications software publishers) which design video games so that they may design games capable of being executed on the hosting service 210. Such tools allow developers to exploit features of the hosting service that would not normally be available in a standalone PC or game console (e.g., fast access to very large databases of complex geometry ("geometry" unless otherwise qualified shall be used herein to refer to polygons, textures, rigging, lighting, behaviors and other components and parameters that define 3D datasets)).

Figure 3:
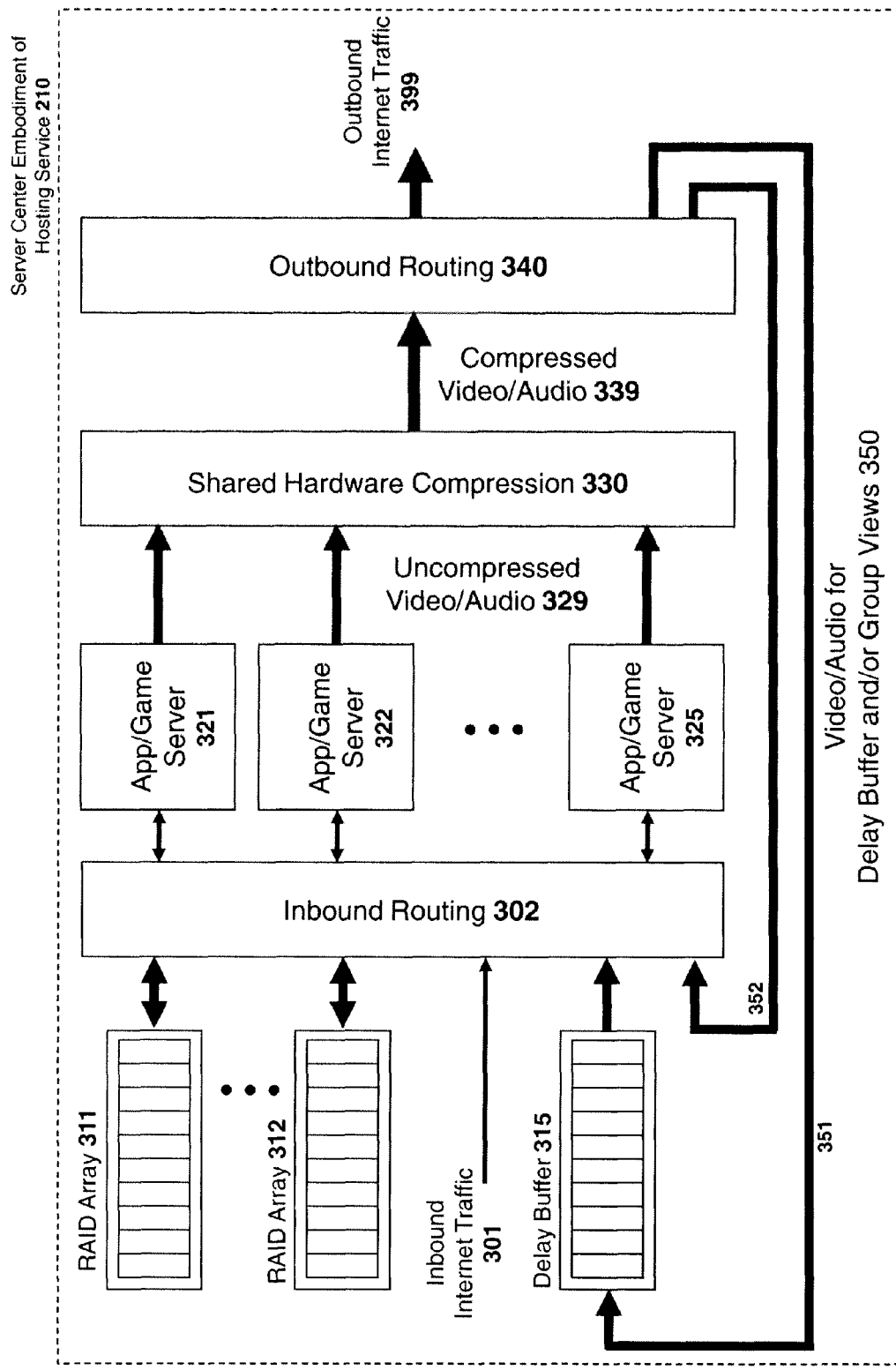
FIG. 3 illustrates one embodiment of a system architecture for compressing audio/video generated by a video game.

FIG. 3 illustrates an embodiment of components of a server center for hosting service 210 utilized in the following feature descriptions. As with the hosting service 210 illustrated in FIG. 2, the components of this server center are controlled and coordinated by a hosting service 210 control system unless otherwise qualified.

Inbound internet traffic 301 from user clients 215 is directed to inbound routing 302. Typically, inbound internet traffic 301 will enter the server center via a high-speed fiber optic connection to the Internet, but any network connection means of adequate bandwidth, reliability and low latency will suffice. Inbound routing 302 is a system of network (the network can be implemented as an Ethernet network, a fiber channel network, or through any other transport means) switches and routing servers supporting the switches which takes the arriving packets and routes each packet to the appropriate application/game ("app/game") server 321-322, 325. In one embodiment, a packet which is delivered to a particular app/game server represents a subset of the data received from the client and/or may be translated/changed by other components (e.g., networking components such as gateways and routers) within the data center. In some cases, packets will be routed to more than one server 321-322, 325 at a time, for example, if a game or application is running on multiple servers at once in parallel. RAID arrays 311-312 are connected to the inbound routing network 302, such that the app/game servers 321-322, 325 can read and write to the RAID arrays 311-312. Further, arrays 311-312 (which may be implemented as multiple RAID arrays) is also connected to the inbound routing 302 and data from RAID arrays 311-312 can be read from app/game servers 321-322, 325. The inbound routing 302 may be implemented in a wide range of prior art network architectures, including a tree structure of switches, with the inbound internet traffic 301 at its root; in a mesh structure interconnecting all of the various devices; or as an interconnected series of subnets, with concentrated traffic amongst intercommunicating device segregated from concentrated traffic amongst other devices. One type of network configuration is a SAN which, although typically used for storage devices, it can also be used for general high-speed data transfer among devices. Also, the app/game servers 321-322, 325 may each have multiple network connections to the inbound routing 302. For example, a server 321-322, 325 may have a network connection to a subnet attached to RAID Arrays 311-312 and another network connection to a subnet attached to other devices.

The app/game servers 321-322, 325 may all be configured the same, some differently, or all differently, as previously described in relation to servers 102 in the embodiment illustrated in FIG. 1. In one embodiment, each user, when using the hosting service is typically using at least one app/game server 321-322, 325. For the sake of simplicity of explanation, we shall assume a given user is using app/game server 321, but multiple servers could be used by one user, and multiple users could share a single app/game server 321-322, 325. The user's control input, sent from client 215 as previously described is received as inbound Internet traffic 301, and is routed through inbound routing 302 to app/game server 321. App/game server 321 uses the user's control input as control input to the game or application running on the server, and computes the next frame of video and the audio associated with it. App/game server 321 then outputs the uncompressed video/audio 329 to shared video compression 330. App/game server may output the uncompressed video via any means, including one or more Gigabit Ethernet connections, but in one embodiment the video is output via a DVI connection and the audio and other compression and communication channel state information is output via a Universal Serial Bus (USB) connection.

The shared video compression 330 compresses the uncompressed video and audio 329 from the app/game servers 321-322, 325. The compression maybe implemented entirely in hardware, or in hardware running software. There may a dedicated compressor for each app/game server 321-322, 325, or if the compressors are fast enough, a given compressor can be used to compress the video/audio from more than one app/game server 321-322, 325. For example, at 60 fps a video frame time is 16.67 ms. If a compressor is able to compress a frame in 1 ms, then that compressor could be used to compress the video/audio from as many as 16 app/game servers 321-322, 325 by taking input from one server after another, with the compressor saving the state of each video/audio compression process and switching context as it cycles amongst the video/audio streams from the servers. This results in substantial cost savings in compression hardware. Since different servers will be completing frames at different times, in one embodiment, the compressor resources are in a shared hardware compression 330 with shared storage means (e.g., RAM, Flash) for storing the state of each compression process, and when a server 321-322, 325 frame is complete and ready to be compressed, a control means determines which compression resource is available at that time, provides the compression resource with the state of the server's compression process and the frame of uncompressed video/audio to compress.

Note that part of the state for each server's compression process includes information about the compression itself, such as the previous frame's decompressed frame buffer data which may be used as a reference for P tiles, the resolution of the video output; the quality of the compression; the tiling structure; the allocation of bits per tiles; the compression quality, the audio format (e.g., stereo, surround sound, Dolby® AC-3). But the compression process state also includes communication channel state information regarding the peak data rate and whether a previous frame is currently being output (and as result the current frame should be ignored), and potentially whether there are channel characteristics which should be considered in the compression, such as excessive packet loss, which affect decisions for the compression (e.g., in terms of the frequency of I tiles, etc). As the peak data rate or other channel characteristics change over time, as determined by an app/game server 321-322, 325 supporting each user monitoring data sent from the client 215, the app/game server 321-322, 325 sends the relevant information to the shared hardware compression 330.

The shared hardware compression 330 also packetizes the compressed video/audio using means such as those previously described, and if appropriate, applying FEC codes, duplicating certain data, or taking other steps to as to adequately ensure the ability of the video/audio data stream to be received by the client 215 and decompressed with as high a quality and reliability as feasible.

Some applications, such as those described below, require the video/audio output of a given app/game server 321-322, 325 to be available at multiple resolutions (or in other multiple formats) simultaneously. If the app/game server 321-322, 325 so notifies the shared hardware compression 330 resource, then the uncompressed video audio 329 of that app/game server 321-322, 325 will be simultaneously compressed in different formats, different resolutions, and/or in different packet/error correction structures. In some cases, some compression resources can be shared amongst multiple compression processes compressing the same video/audio (e.g., in many compression algorithms, there is a step whereby the image is scaled to multiple sizes before applying compression. If different size images are required to be output, then this step can be used to serve several compression processes at once). In other cases, separate compression resources will be required for each format. In any case, the compressed video/audio 339 of all of the various resolutions and formats required for a given app/game server 321-322, 325 (be it one or many) will be output at once to outbound routing 340. In one embodiment the output of the compressed video/audio 339 is in UDP format, so it is a unidirectional stream of packets.

The outbound routing network 340 comprises a series of routing servers and switches which direct each compressed video/audio stream to the intended user(s) or other destinations through outbound Internet traffic 399 interface (which typically would connect to a fiber interface to the Internet) and/or back to a delay buffer 315 (which may be implemented using one of the RAID arrays), and/or directly back to the inbound routing 302, and/or out through a private network (not shown) for video distribution. Note that (as described below) the outbound routing 340 may output a given video/audio stream to multiple destinations at once. In one embodiment this is implemented using Internet Protocol (IP) multicast in which a given UDP stream intended to be streamed to multiple destinations at once is broadcasted, and the broadcast is repeated by the routing servers and switches in the outbound routing 340. The multiple destinations of the broadcast may be to multiple users' clients 215 via the Internet, to multiple app/game servers 321-322, 325 via inbound routing 302, and/or to one or more delay buffers 315. Thus, the output of a given server 321-322 is compressed into one or multiple formats, and each compressed stream is directed to one or multiple destinations.

Further, in another embodiment, if multiple app/game servers 321-322, 325 are used simultaneously by one user (e.g., in a parallel processing configuration to create the 3D output of a complex scene) and each server is producing part of the resulting image, the video output of multiple servers 321-322, 325 can be combined by the shared hardware compression 330 into a combined frame, and from that point forward it is handled as described above as if it came from a single app/game server 321-322, 325.

Note that in one embodiment, a copy (in at least the resolution or higher of video viewed by the user) of all video generated by app/game servers 321-322, 325 is recorded in delay buffer 315 for at least some number of minutes (15 minutes in one embodiment). This allows each user to "rewind" the video from each session in order to review previous work or exploits (in the case of a game). Thus, in one embodiment, each compressed video/audio output 339 stream being routed to a user client 215 is also being multi-casted to a delay buffer 315. When the video/audio is stored on a delay buffer 315, a directory on the delay buffer 315 provides a cross reference between the network address of the app/game server 321-322, 325 that is the source of the delayed video/audio and the location on the delay buffer 315 where the delayed video/audio can be found.

App/game servers 321-322, 325 may not only be used for running a given application or video game for a user, but they may also be used for creating the user interface applications for the hosting service 210 that supports navigation through hosting service 210 and other features.

Virtualization and Encryption System and Method for Hosting Applications

In one embodiment of the invention, the application/game servers 321-322, 325 illustrated in FIG. 3 are implemented as virtualized Windows platforms. Given that the application hosting service 210 may have thousands of application/game servers 321-322, 325 running Windows and tens of thousands of users, it would be impractical to install every application in the service to all Windows machines and replicate user-specific changes for those applications across all these machines. One embodiment of the invention addresses these issues in a compatible and scalable fashion using the virtualization techniques described below. In addition, to ensure that the application program code remains secure, one embodiment of the invention employs a variety of encryption techniques which will be discussed below in detail.

Figure 4:
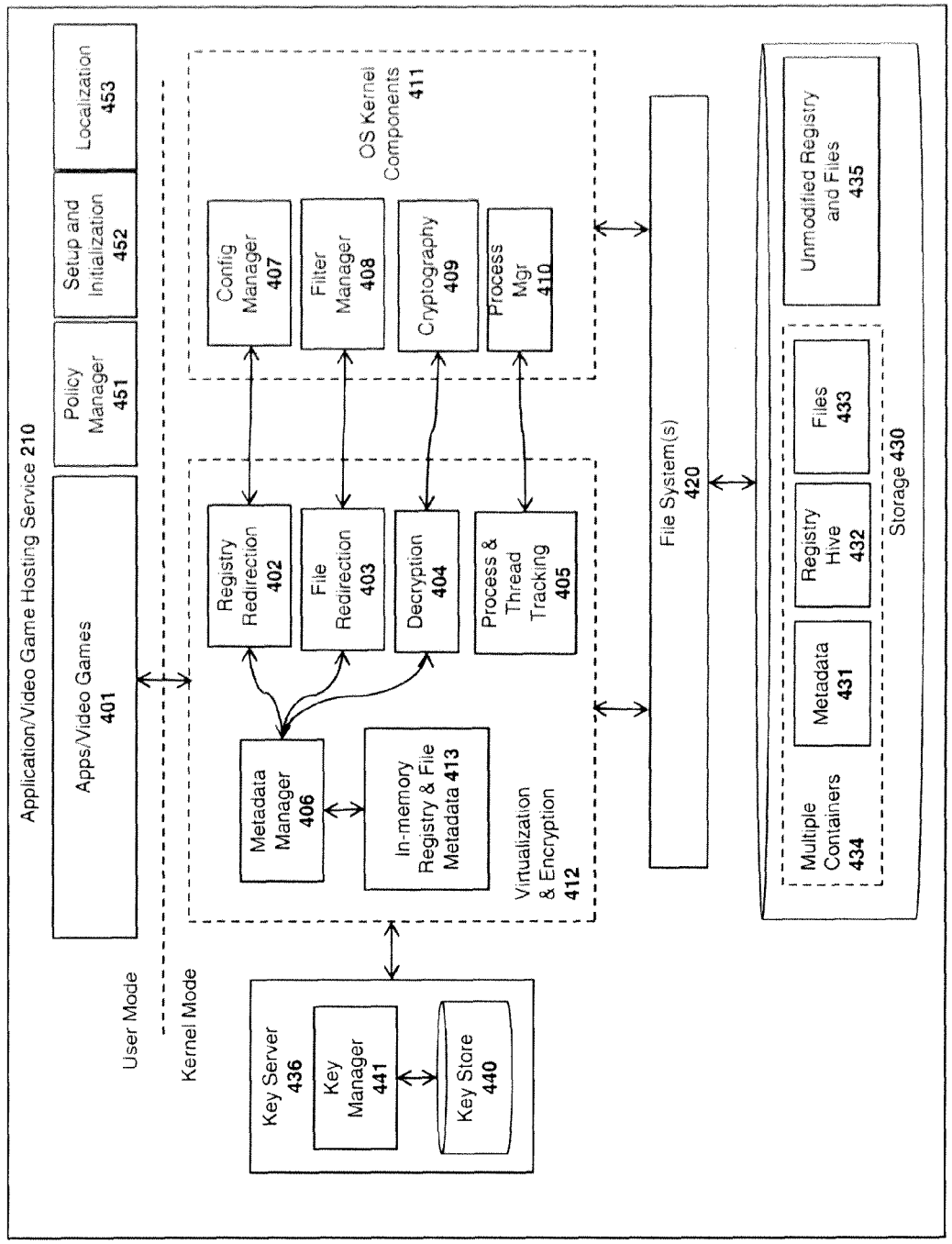
FIG. 4 illustrates a system architecture according to one embodiment of the invention.

As illustrated in FIG. 4, one embodiment of the invention includes a virtualization and encryption service 412 to generate a virtualized operating system environment for the applications/video games 401 executed on the various application/game servers. In the embodiments described herein, the virtualization and encryption service 412 is implemented as a file system mini-filter driver for Windows. It should be noted, however, that the underlying principles of the invention are not limited to a Windows implementation.

As illustrated, the virtualization and encryption service 412 includes a registry redirection module 402 for processing registry operations on behalf of the applications/video games 401; a file redirection module 403 for intercepting file system operations generated by the application/video games 401, directing those file operations to a virtual location when appropriate, and passing the modified operations through the native file system 420 (which in one embodiment is the NTFS file system used in current Windows environments); a decryption module 404 for performing the various encryption and decryption techniques described herein; and a process and thread tracker module 405 for generating a hierarchical map of known allowable processes/threads and monitoring active system processes and threads using the process map. Each of these system components is described in detail below.

As illustrated in FIG. 4, the various virtualization and encryption service components 402-405 interface with corresponding OS kernel components 407-410, respectively, to perform their designated functions. In one embodiment the OS kernel components are Windows OS kernel components; however, the underlying principles of the invention are not limited to a Windows OS implementation. In particular, the registry redirection module 402 interfaces with a configuration manager 407 in the OS kernel in response to registry operations. In one embodiment, the registry redirection module 402 redirects all registry modifications to an in-memory representation of the registry 407, sometimes referred to as a "registry hive." For example, upon detecting that an application or video game has generated a registry read/write operation to a particular registry key, the registry redirection module 402 intercepts and pends the operation, generates a new request directed at the registry hive on behalf of the application/video game, copies the results from the request, and completes the pending operation. In one embodiment, registry hive data 432, application program files 433, and file metadata 431 are stored within a container 434 data structure which (as described below) is secure and easily ported between application/game servers. When the active containers 434 are unloaded from memory (e.g., when the user stops playing a video game and logs off of the system) the registry key modifications made to the in-memory registry metadata 413 are persistently stored as registry hive data 432 within a container 434 associated with the user.

Subsequently, when the user logs back in to the system (e.g., to play the same video game or execute the same application 401), the registry changes are read from the stored registry hive data 432 and loaded into memory. Any registry operations to these registry keys are then intercepted by the registry redirection module 402 and redirected to the in-memory representation 413.

Additionally, in response to the file system operations generated by the currently-executing application/video game 401, a file redirection module 403 redirects the file system operations to the container 434 which stores virtualized copies of the files 433 and file metadata 431. By way of example, when an application is initially installed on a computer system, a setup program (e.g., "setup.exe") installs application files to a specific location on a local hard drive such as "C:/program files/EA/Crysis/." These files are represented in FIG. 4 as unmodified application files 435 which, in one embodiment, are designated by the virtualization and encryption service 412 as "read only." In one embodiment, in response to a subsequent request by an application 401 to modify the files, the file redirection module 403 modifies the path to the files for these operations to a virtual file location 433 associated with the container 434 such as "D:/program files/EA/Crysis/." Using the modified path, the files 433 are accessible via the native file system 420 (which in a Windows implementation is typically a New Technology File System (NTFS)). In one embodiment, the virtual location of the files for each user and machine is identified by file metadata 407 stored in memory as the application 401 is executed. The registry and file metadata 407 is updated to track each registry and file operation. When the application is closed (e.g., when the user logs off the system), the file metadata 431 is stored within the same container 434 as the underlying files 433 so that it may be used in subsequent instantiations of the application. In this manner, a virtual file system identified by the redirection module 403 is effectively merged into the real file system in which the unmodified files and registry 435 are stored.

In one embodiment, multiple containers 434 are maintained on the system for each user and application. For example, for a particular video game—the video game Crysis™ will be used as an example—different containers 434 may be maintained which contain different versions of the metadata 431 and application program files 433. The different containers may be identified using a logical naming convention (e.g., Crysis1.olc, Crysis2.olc, Crysis3.olc, etc). In one embodiment, all current user data and other modified program files are stored within a designated container known as a user-data container and each user is assigned a different user-data containers per game. Multiple related applications can share a single user-data container for a user. Multiple users can be designated to share a single shared user-data for an application. Different containers may also be used for application updates (e.g., patches created by the application publisher). When a particular user logs in to the system to play a particular video game or use a particular application, all containers related to a game/application and a specific user-data container will be loaded by the virtualization and encryption service 412. As previously mentioned, in one embodiment, there is a separate database system that tracks the location for application specific user-data containers.

As mentioned above, the same basic principles apply to registry updates. For example, in response to a request by an application to update the registry key HKLM/Software/OnLive the registry redirection module 402 will pend the request, perform the update to a virtual location with a copy of the registry key identified by the metadata 407 (e.g., HKLM/Software/OnLive stored in any of the containers), get the results of the update (e.g., success and value or failure), and pass the results back to the pending request.

In one embodiment, when initially connecting to the hosting service 210, the user is designated an application game server 102 for the user's application session. On a following connection to the hosting service 210, the user may be designated a different application game server for the same game. This requires the user-data generated from the last session to be localized within a server 102 for the new session. The localization may include modifying the unique security ID(SID) for user accounts, and accounting for differences in hardware and operating systems on the new server 102.

In one embodiment, the registry hive 432 illustrated in FIG. 4 does not contain the entire registry but rather, only those registry keys which have been modified. As an application 401 writes to the registry, the write operations are redirected to the in-memory representation 413 of the registry keys. The registry changes are then stored persistently within the registry hive data 432 of the container 434. When the user subsequently logs back into the system, the modified registry keys are merged with the complete registry data 435 (including unmodified keys). Registry read operations directed to previously-modified registry keys are then redirected to the in-memory representation 413.

In one embodiment, the virtualization and encryption service 412 includes a process and thread tracking module 405 for tracking all active processes/threads associated with an application 401. In particular, in one embodiment, when an application is initially loaded on the system, the process and thread tracking module 405 generates a map of the processes and threads and the hierarchy between the processes and threads which it stores as metadata. This includes, for each process, all of its child processes and its parent and grandparent processes. In one embodiment, a process is identified by the full path to the executable and the pre-computed SHA-256 hashing value. Subsequently, when an application is executed and attempts to load a series of processes/threads into memory, the process and thread tracking module 405 reads the metadata via the metadata manager 406 and compares the map with the requested processes/threads. If a particular process or thread is not found in the map, or is found at a different level of the process/thread hierarchy than that stored in the map or doesn't match the hash or the command line arguments do not match, then the process and thread tracking module 405 may prevent the process/thread from loading, may trigger an alert to be addressed by a system administrator, and/or may take automated corrective action. Generating a process/thread map for each application and comparing the map to requested processes/threads in this manner provides for additional security and makes it difficult for a hacker to compromise the system using an unauthorized processes or threads.

In one embodiment, for the files associated with each application, some of the modified files 433 are encrypted for improved security. In particular, one embodiment of the virtualization and encryption service 412 includes a decryption module 404 for encrypting/decrypting application files using a private/public key process which will now be described.

In one embodiment, the online game hosting service 210 generates a Rivest, Shamir and Adleman (RSA) public/private key pair and provides the public key to each video game publisher. The publisher then uses a unique secret key to encrypt the application files (e.g., the video game or application binaries), uses the public key to encrypt the secret key, and provides the encrypted application or video game files and encrypted secret key to the application/video game hosting service 210. The encrypted application/video game and encrypted secret key may then be securely transmitted to the application/video game hosting service 210. The decryption module 404 may then use the private key of the public/private key pair to decrypt the secret key and then use the decrypted secret key to decrypt the application/video game binaries. In one embodiment, 256- or 512-bit Advanced Encryption Standard (AES) encryption is used. However, the underlying principles of the invention are not limited to any particular type of encryption.

In one embodiment, the encrypted application/video game files are stored in the containers 434 in this encrypted format and the secret key is stored in a key store 440 managed by a key manager service 441 on a key server 436. Consequently, the containers 434 may be copied to any of the application/video game hosting servers 321-322, 325 securely. If a malicious user makes a copy of the files, they will be of no use to the user without the secret key, which is stored securely within the key store 440 under the control of the key manager service 406. In one embodiment, the metadata 431 associated with the files includes an encryption attribute to indicate that the files in the container 434 are encrypted (i.e., so any write request to a file is completely protected).

As mentioned above, in one embodiment, the encrypted secret keys of application publishers are stored within a secure key store 440 managed by a key manager service 441. These secret keys are never transmitted to application/game servers of the hosting service 321-322, 325 in an unencrypted state. In one embodiment, each instance of the virtualization and encryption service 412 generates its own unique public/private key pair and provides the public key to the key manager 441. The key manager 441 then uses the public key to encrypt the secret keys of application/game publishers when transmitting the secret keys to different instances of the virtualization and encryption service 412. The decryption module 404 of each instance of the virtualization and encryption service 412 may then use the private key to decrypt the application files and other encrypted data 432-433 stored within the container 434 for a particular user and application.

In one embodiment, authentication techniques are employed to ensure that only authorized processes and threads can access the encrypted content. The process and thread tracker 405 maintains a list of trusted processes and threads who are allowed to view encrypted content. Consequently, upon receipt of a request by a particular process to access the encrypted content, the process and thread tracker module 405 may compare the instantiation of the process/thread to the trusted list to ensure that the process/thread is authorized to execute and access the encrypted content.

In one embodiment, the authentication techniques are employed to ensure that only authorized processes and threads can execute in the system. In particular, as previously mentioned, the process and thread tracker module 405 maintains a map of allowed processes and threads including the hierarchical relationships between the processes and threads. In addition, the process and thread tracker module maintains a full path to the executable, command-line parameters and SHA-256 hashing. Upon process or thread creation, the process and thread tracker module confirms that this is an allowed process or thread by verifying its hierarchical relationships, hashing value and command-line parameters. If process creation doesn't match expected values then creation is blocked.

In one embodiment, the file system operations redirected by the file redirection module 403 and the encryption of the application/video game binaries occurs transparently to the executing applications/video games (i.e., the applications are unaware that the underlying files are encrypted). When cypher-block chaining is used to encrypt a file as described above, the encrypted file may be larger in size than the unencrypted file (i.e., to account for the encryption overhead). Consequently, in one embodiment, when reading or writing a file, the virtualization and encryption service 412 initially opens a larger, virtual file system buffer than is typically used for reading/writing the unencrypted file. For example, if an application needs 30 unencrypted bytes from a file, the NTFS file system would normally allocate a 30-byte buffer. In one embodiment of the invention, however, the file redirection module 403 may need to swap out the 30-byte buffer for a 48-byte virtual buffer to read 48 bytes in order to properly decrypt the file. The 48 bytes may then be read into the virtual buffer and decrypted to generate the 30 byte file. The file redirection module 403 may then swap out the 48 byte buffer for a 30 byte buffer containing the decrypted content and provide the 30 byte buffer to the requesting application 401. In one embodiment, the read buffers are implemented as standard NTFS target buffers that the NTFS file system 420 fills with data. As previously mentioned, however, that the underlying principles of the invention are not limited to an implementation using the NTFS file system.

In one embodiment, before a container is loaded, one embodiment of the virtualization and encryption engine 412 ensures that there are no open handles to a requested file in the virtual file system (to prevent malicious users from breaching the system using open handles). Similarly, when a container is unloaded (e.g., in response to a user logging out of an application), all of the in-memory container file's data 407 is purged so that all the decrypted contents are flushed out of system memory. In addition, in one embodiment, the virtualization and encryption service 412 ensures that there are no open handles to encrypted files when a container is unloaded. In one embodiment, if a handle is detected then the system is rebooted so that all processes which have access to these open handles are terminated.

In one embodiment, because the virtualization and encryption service 412 tracks multiple containers, files may be spread out to decrease load times. Additionally, because the containers are portable for the reasons set forth above, they may be stored on different machines or shared network drives. Typically, an application loads code and data sections in bursts separated by long periods of execution times, Thus, a container may be carved out into multiple containers and spread out so that data that is accessed early on is kept closer to the machine that executes these applications/video games. Consequently, load and distribution times may be decreased without consuming disk space. This allows us to do away with having copies of all applications on each of the machines that execute them.

Figure 5:
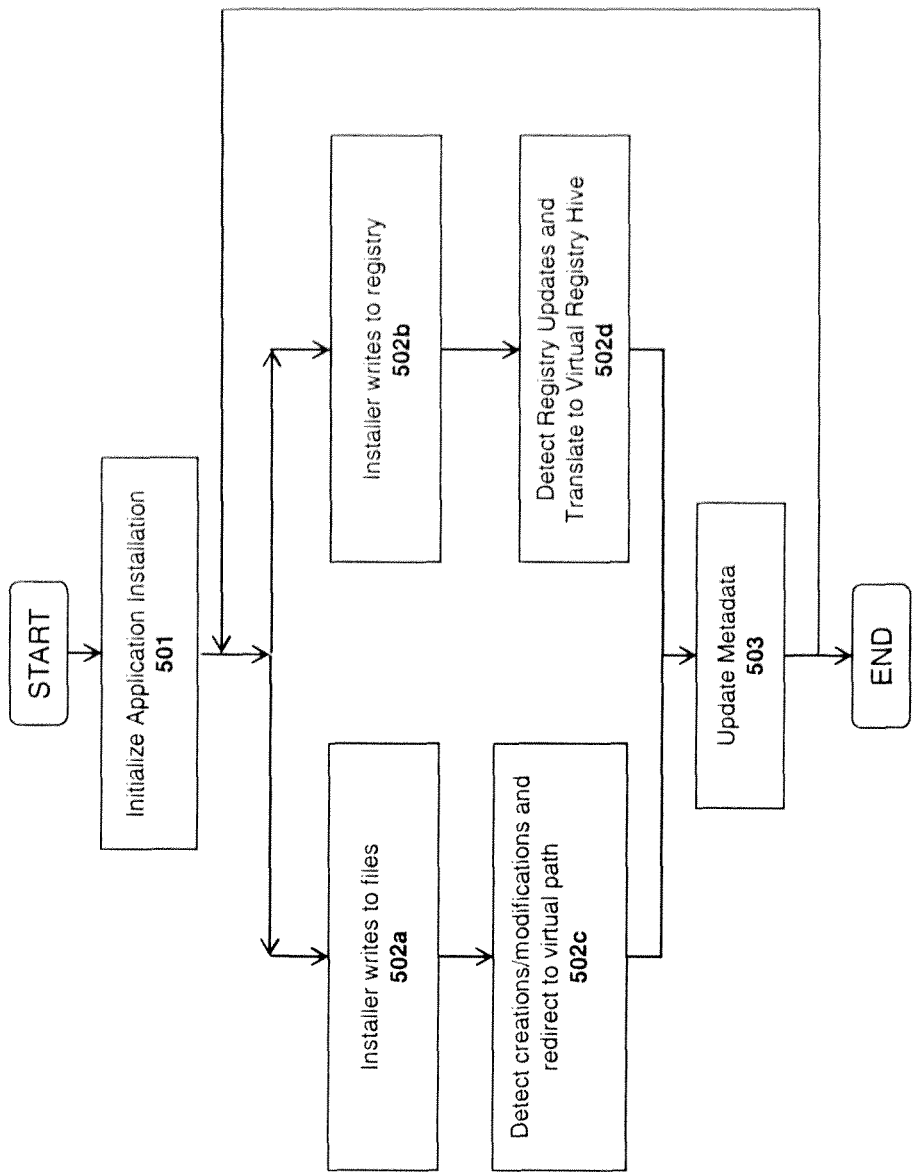
FIG. 5 illustrates one embodiment of a method for installing an application such as a video game in a virtualized environment.

One embodiment of a method for installing an application in a hosted virtual environment is illustrated in FIG. 5. The method may be implemented within the context of the system architecture shown in FIG. 4. However, the method is not limited to any particular system architecture.

At 501, the application installation is initialized. For most applications, this means executing a "setup.exe" program which copies application binaries to a designated folder on the hard drive and updates the system registry. At 502a, installation commands to copy binaries are detected and, in one embodiment, are redirected to a designated virtual path at 502c. As previously described, if the path is, for example, C:/program files/Crysis705, then the installation path may be redirected to D:/program files/Crysis705. In one embodiment, the updates are made to read-write container identified by the path (as described above). In a similar manner, at 502b, installation commands write to the registry. The game capture in a read-write container becomes a read-only container during game execution. During this time, the read-write container is the user-data for that game.

At 502d, registry updates made by the installation program are detected and translated to a virtual registry hive. For example, in response to a request by an application to update the registry key HKLM/Software/OnLive stored in the hive on the C: drive, the registry redirection module 402 will pend the request, perform the update to a virtual location with a copy of the registry key identified by the metadata 407 (e.g., HKLM/Software/OnLive stored on the D: drive), get the results of the update (e.g., success and value or failure), and pass the results back to the pending request.

At 503, metadata identifying the new locations for the files and registry keys is updated. Subsequently, when the user logs out of the application, the metadata, files and registry updates are stored within a container (as previously described).

Figure 6:
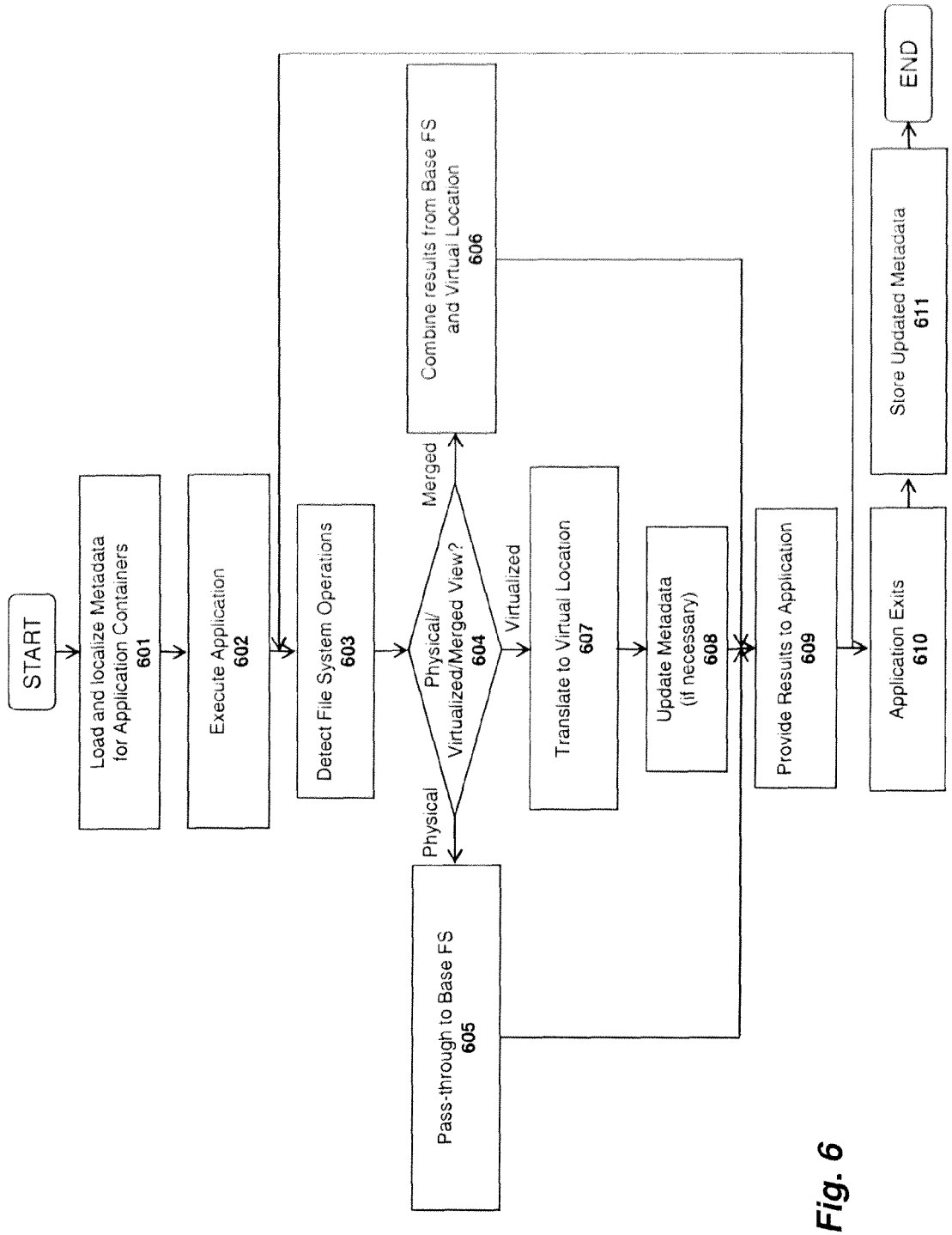
FIG. 6 illustrates one embodiment of a method for executing file system operations.

One embodiment of a method for executing an application and recording file updates in a hosted virtual environment is illustrated in FIG. 6. The method may be implemented within the context of the system architecture shown in FIG. 4. However, the method is not limited to any particular system architecture.

At 601, the metadata for all application containers is loaded in memory and localized and, at 602, the application is executed. At 603, a file system operation by the application is detected and, at 604, a determination is made as to whether the file system operation is directed to a real/physical, virtualized, or merged (combined real/physical and virtual) location (e.g., to C:/program files/program name). If real, the operations are passed through to the base file system at 605; if virtual, then at 607, the path is translated to the virtual location (e.g., D:/program files/program name) and the file system operation is executed; if merged, then at 606, the results are combined from the base file system and the virtual location. Metadata is updated as necessary at 608 and (if necessary to identify the updates to the virtual location). At 609, the results of the operation are provided to the application and, at 610, the application exits (e.g., in response to the user logging out of the system). At 611, the updated metadata is stored within the application container (as described above).

Figure 7:
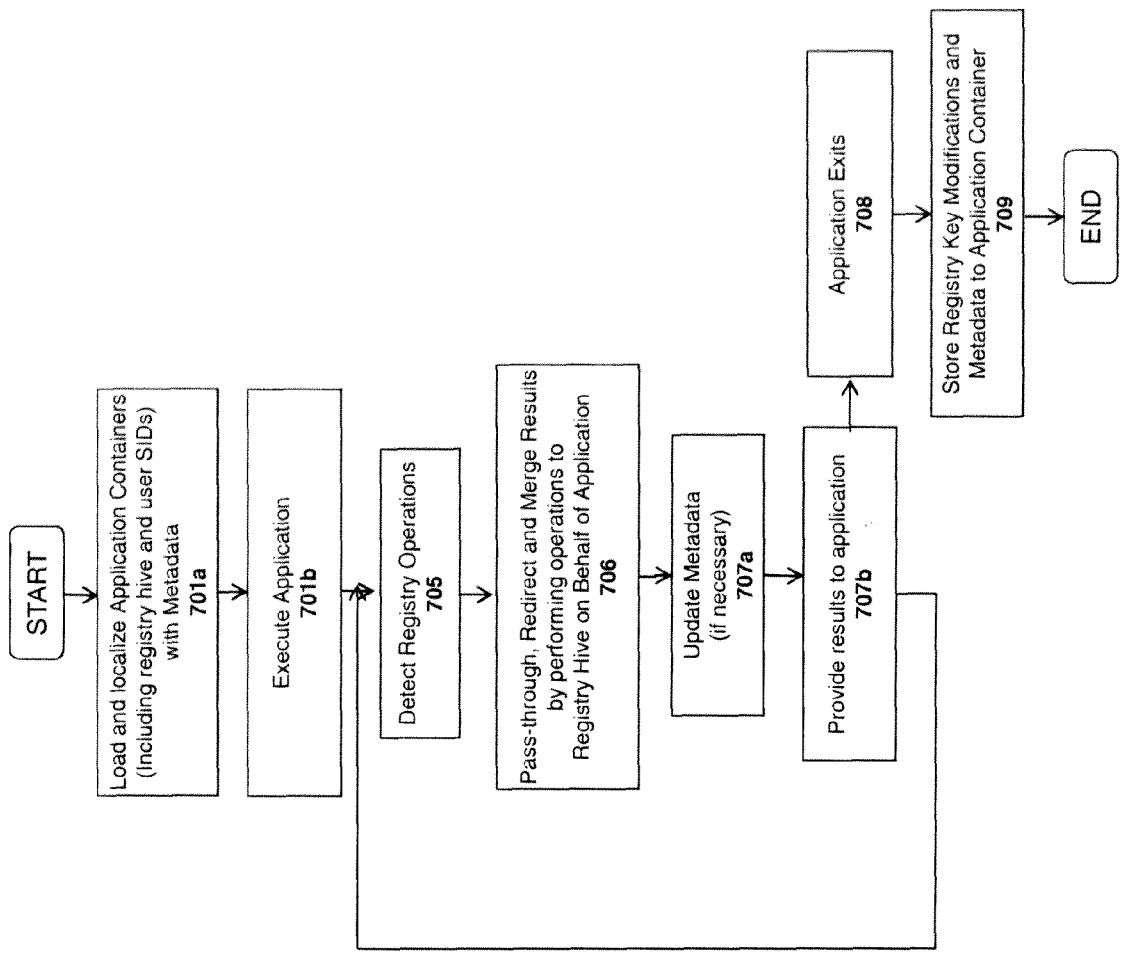
FIG. 7 illustrates one embodiment of a method for executing registry operations in a virtualized environment.

One embodiment of a method for executing an application and recording registry updates in a hosted virtual environment is illustrated in FIG. 7. The method may be implemented within the context of the system architecture shown in FIG. 4. However, the method is not limited to any particular system architecture.

At 701*a*, the application container with the metadata and registry hive is loaded into memory. The registry hive is imported from a registry hive file and mounted onto a virtualized location in memory for the active registry file. The registry keys may be stored in a standard format and imported from a .reg file and/or mounted from a .dat file. The underlying principles of the invention remain the same regardless of how the registry keys are imported/mounted.

At 701*a* a determination is made as to whether the current user SID matches the SID indicated in the registry. As mentioned above, a user account on a particular machine has a unique SID associated with it (identified by a key such as HKEY_USERS\S-1-5-21-2118976691-607243524-348483912-1295 and HKEY_USERS\S-1-5-21-2118976691-607243524-348483912-1295_Classes). Consequently, when a user logs in and out from one application/game server (e.g., server 321) and subsequently logs in to a different application/game server (e.g., server 322), the same user account will have a different SID on the new machine. To address this issue, in one embodiment of the invention, before the registry key is mounted for a particular registry hive 432, an SID match is performed at 701*a*. If the current SID does not match the SID stored in the registry hive then, at 701*a*, an SID resolution algorithm is executed to update the SID value associated with the current registry hive. Once the SID is fixed to the correct value, the registry hive is loaded at the appropriate mount point and the user is permitted to execute the application.

At 705, registry operations are detected as the application executes and, at 706, the registry updates are redirected on behalf of the application to the in-memory registry hive. The results of the updates (e.g., successful and value or failure) are provided to the application. At 707*a*, the metadata associated with the registry is updated to reflect the updates and at 707*b* the results are provided to the application. At 708, the application is terminated (e.g., in response to the user logging out of the application) and, at 709, the registry key modifications and metadata are persistently stored within the user/application container.

Figure 8:
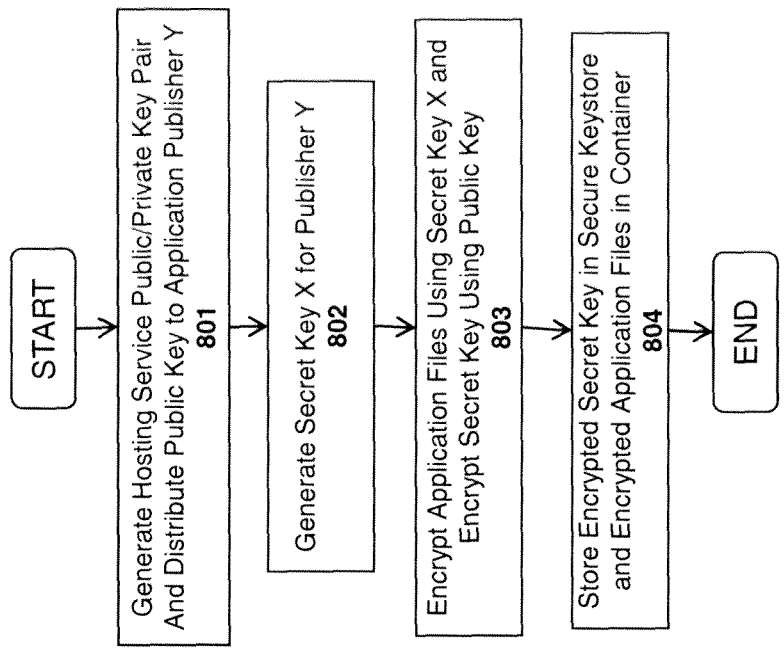
FIG. 8 illustrates one embodiment of a method for encrypting application files such as video game files for an application hosting service.

One embodiment of a method for encrypting application program code is illustrated in FIG. 8. The method may be implemented within the context of the system architecture shown in FIG. 4. However, the method is not limited to any particular system architecture.

At 801, a public/private key pair associated with the application hosting service is generated and the public key is provided to application publishers. At 802, a secret key is generated for a particular publisher (Key X for Publisher Y). At 803, the application files for a particular application or video game are encrypted using the secret key, and the secret key is encrypted using the public key. At 804, the encrypted secret key is stored within a secure key store (e.g., such as the key store 440 shown in FIG. 4) and the encrypted application files are stored within a database or file system on the application hosting service.

Figure 9:
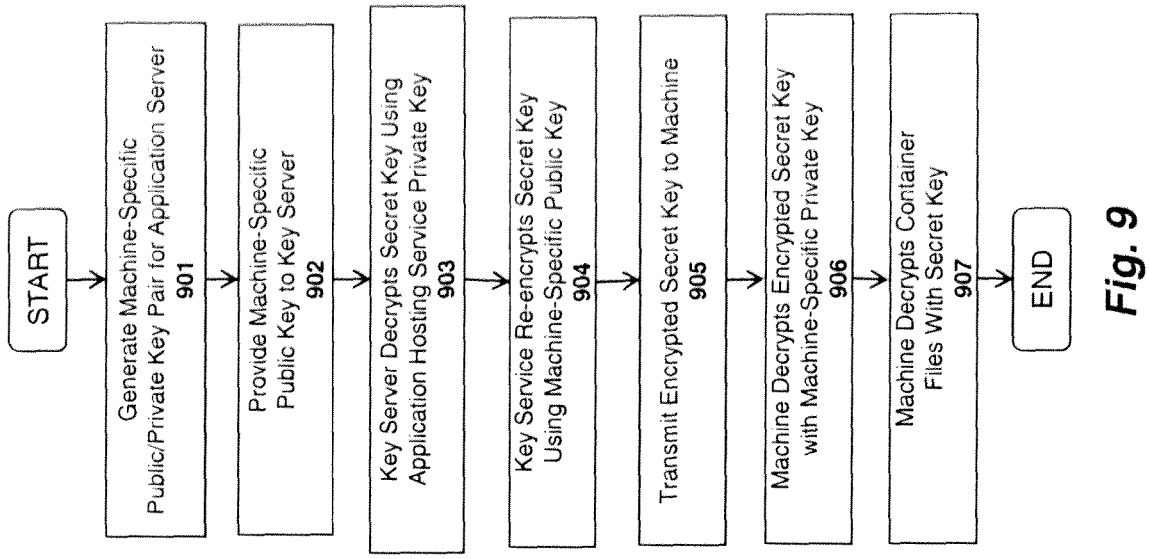
FIG. 9 illustrates another embodiment of a method for securely passing encryption keys for decrypting application files such as video game files for an application hosting service.

One embodiment of a method for securely decrypting and executing application program code generated by an application publisher is illustrated in FIG. 9. The method may be implemented within the context of the system architecture shown in FIG. 4. However, the method is not limited to any particular system architecture.

At 901, each application/game server 321-322, 325 generates its own unique public/private key pair. At 902, the machine-specific public key is provided to the key server (e.g., key server 436 in FIG. 4). At 903, the key server decrypts the secret key (previously encrypted by the application publisher along with the application binaries) using the private key of the hosting service. At 904 the key service re-encrypts the secret key using the machine-specific public key (generated in step 901) and, at 905, transmits the encrypted secret key to the application/game server 321-322, 325 on which the application is to be executed. At 906, the machine decrypts the encrypted secret key with the machine-specific private key. Finally, at 907, the application/video game hosting server decodes the container files 431-433 using the decrypted secret key and the application is executed. Thus, using these techniques, the binaries, registry data and other metadata for video games and other types of applications may be encrypted and securely transmitted between a storage location (e.g., RAID Arrays 405 shown in FIG. 1) and an application/game server (e.g., servers 321-322, 325 in FIG. 3).

Figure 10:
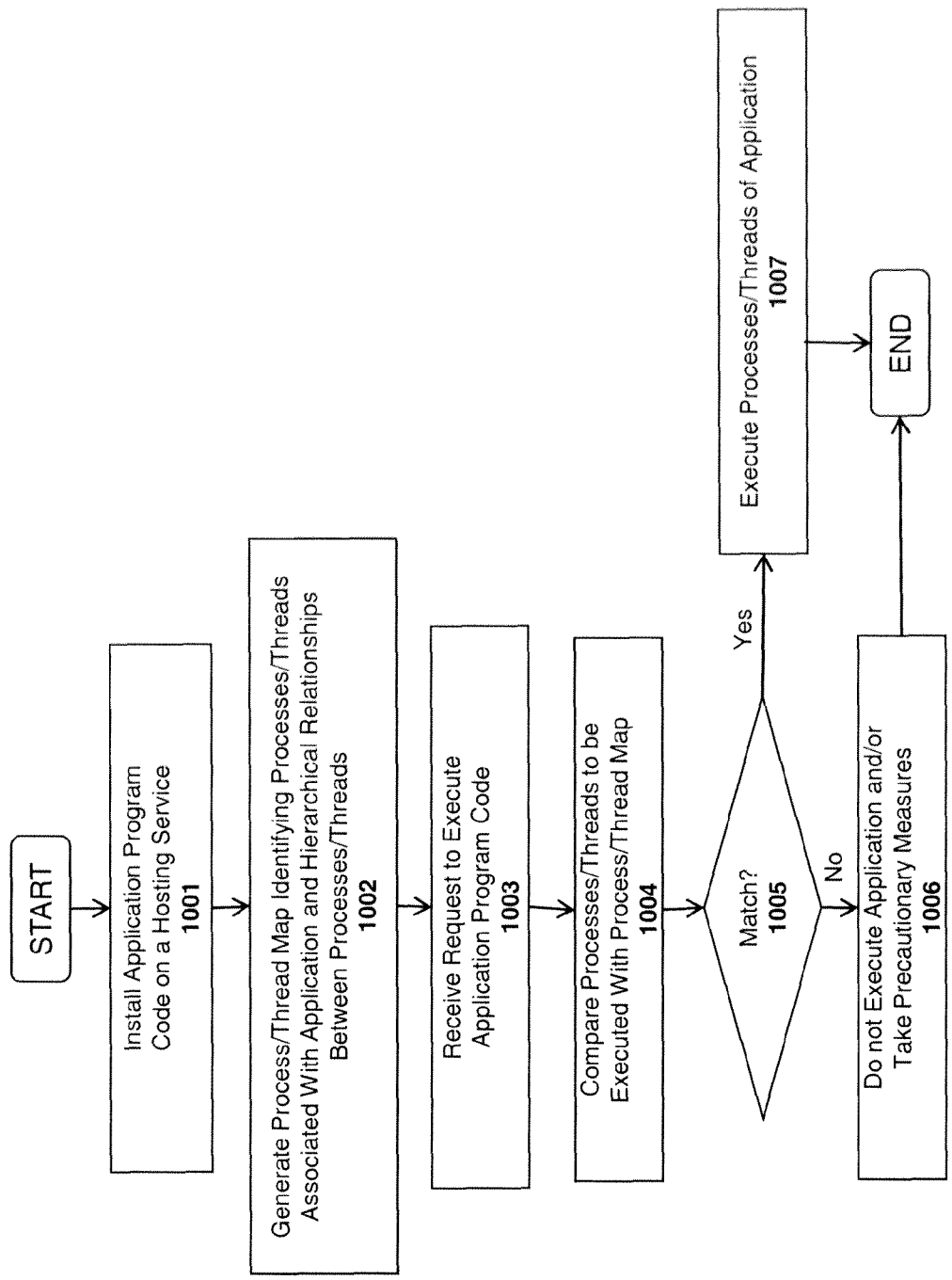
FIG. 10 illustrates one embodiment of a method for securely executing application program code on a hosting service by tracking processes and relationships between processes.

One embodiment of a method for securely executing application program code on a hosting service is illustrated in FIG. 10. The method may be implemented within the context of the system architecture shown in FIG. 4. However, the method is not limited to any particular system architecture.

At 1001, application program code is installed on a hosting service (e.g., by running a setup.exe or similar executable program). At 1002, the application is executed and analyzed to generate a process/thread map which identifies the processes/threads of the executing application and the relationships between the processes/threads. For example, as mentioned above, the process/thread map may indicate, for each process, all of the child processes, parent processes, and grandparent processes. The process/thread map is then stored in persistent storage for later use.

At 1003, a request is received to execute the application program code (e.g., a user request to execute a particular video game). At 1004, the processes/threads to be executed are compared against the process/thread map to ensure that all processes/threads to be executed are found in the map at the correct hierarchical location (i.e., with the same sets of child, parent, and grandparent processes). If any requested process/thread, or it's hierarchical position does not match, determined at 1005, at 1006 a decision is made to not execute the application and/or other precautionary measures may be taken (e.g., such as rebooting the machine and/or notifying a system administrator). As mentioned, each process may be identified by its process ID. If, however, each process/thread has a matching process thread in the map at the correct hierarchical location, then at 1007, the processes/threads of the application are allowed to execute.

Figure 11:
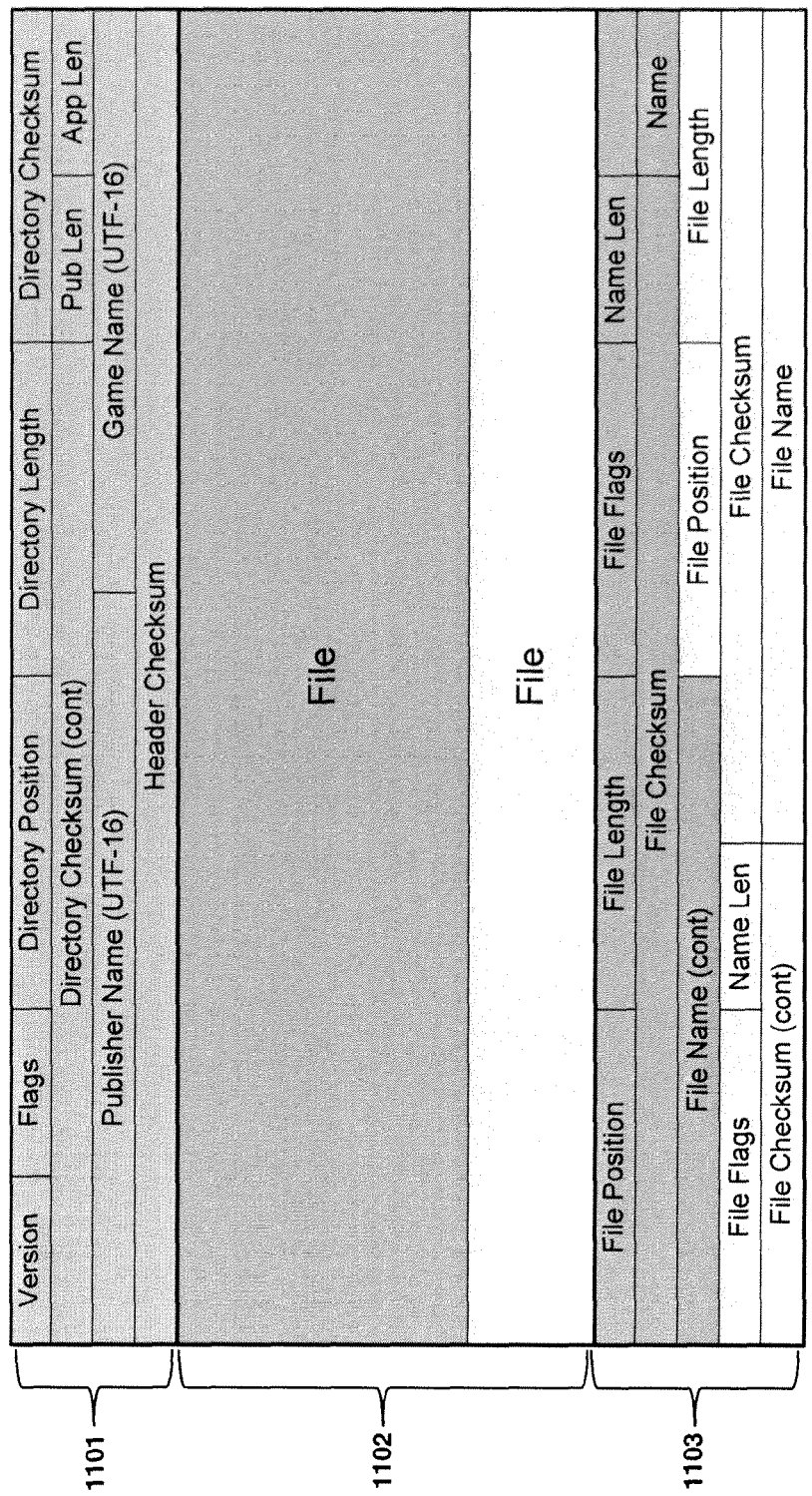
FIG. 11 illustrates an exemplary container format used for packing files.

An exemplary container format used for packaging files (e.g., video game files) into file containers 434 in one embodiment of the invention is illustrated in FIG. 11. In one embodiment, the illustrated container format may be used as a general replacement for Zip or tar to hold application files, video assets, metadata, and other system information described herein.

As illustrated, the container format of this embodiment comprises a header portion 1101, a file portion 1102 and a directory portion 1103. The header portion contains various different types of metadata related to container including, by way of example and not limitation, the version of the container files, flags, a directory position indicating the location of the directory portion 1103 within the container, a directory length indicating the size of the directory portion 1104, a directory checksum containing a checksum on the directory portion 1104, a pub len and app len, a publisher name indicating the name of the publisher of the container, a game name indicating the name of the game packaged in the container and a header checksum containing a checksum on the header portion 1101.

The file portion 1102 contains the actual files of the container and the directory portion 1103 contains information related to each of the files including the file position within the container (e.g., as an offset value), file length indicating the size of each file, file flags indicating, name length indicating the length of the name for each file, a file checksum containing a checksum over each file, and a file name for each file.

The features provided by the file container format include publisher-controlled file alignment within the container; automated file re-ordering to minimize seeking; and the ability to distribute pieces of the container across multiple servers (e.g., preventing the entire game from being in a single location).

One embodiment of the invention supports the ability to add and remove features for an application without re-starting an application. For instance, a game may provide a weaponry selection as an add-on feature. Once a user purchases a weapon, only his game has access to those weapons. Instead of compiling separate binaries for each combination of weapons, these features may be executed dynamically as add-on features. In one embodiment, the add-on features are implemented as special containers that can be loaded/unloaded while the game is running (with participation from the games).

In one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, the modules may be implemented on a programmable digital signal processor ("DSP") such as a Texas Instruments' TMS320x architecture (e.g., a TMS320C6000, TMS320C5000, ... etc). Various different DSPs may be used while still complying with these underlying principles.

Embodiments may include various steps as set forth above. The steps may be embodied in machine-executable instructions which cause a general-purpose or special-purpose processor to perform certain steps. Various elements which are not relevant to these underlying principles such as computer memory, hard drive, input devices, have been left out of some or all of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

What is claimed is:

1. A computer-implemented method for securely loading application program code in an application hosting service comprising:
   installing an application on the application hosting service;
   generating a process/thread map of processes/threads included in the application, the map including an identification of each process/thread and the hierarchical relationships between the processes/threads;
   receiving a request to execute processes/threads of an application;
   comparing the processes/threads to be executed with the process map to determine whether each process/thread to be executed is included in the map and that each process/thread is to be executed at a correct position in the hierarchy; and
   executing the processes/threads of the application if the processes/threads to be executed are found within the process/thread map at a correct position in the hierarchy specified in the process/thread map; and
   if the processes/threads to be executed are not found within the process/thread map at a correct position in the hierarchy specified in the process/thread map, then refraining from executing the application.

2. The method as in claim 1 wherein if the processes/threads to be executed are not found within the process/thread map at a correct position in the hierarchy specified in the process/thread map, then rebooting a computer on which the application is attempting to be executed.

3. The method as in claim 1 further comprising:
   executing a virtual machine on which the application is to be executed, the virtual machine including a virtual file system, the method further comprising redirecting file and registry requests of the application to a virtual location in the virtual file system.

4. The method as in claim 3 further comprising:
   determining whether any open handles exist prior to executing the application; and
   only executing the application if no open handles exist.

5. The method as in claim 1 wherein installing the application comprises:
   storing application binaries and registry entries for the application within an encrypted container; and
   loading the container into memory and decrypting the container only if the processes/threads to be executed are found within the process/thread map at a correct position in the hierarchy specified in the process/thread map.

6. The method as in claim 1 wherein the process/thread map further includes contextual information such that different maps can be derived for use in different contexts.

7. The method as in claim 1 further comprising:
receiving a request during system runtime to switch the process/thread map that are allowed to execute; and
responsively switching the process/thread map with a new process/thread map.

8. A system for securely loading application program code in an application hosting service, the system including a memory for storing program code and a processor for processing the program code to perform the operations of:
installing an application on the application hosting service;
generating a process/thread map of processes/threads included in the application, the map including an identification of each process/thread and the hierarchical relationships between the processes/threads;
receiving a request to execute processes/threads of an application;
comparing the processes/threads to be executed with the process map to determine whether each process/thread to be executed is included in the map and that each process/thread is to be executed at a correct position in the hierarchy; and
executing the processes/threads of the application if the processes/threads to be executed are found within the process/thread map at a correct position in the hierarchy specified in the process/thread map; and
if the processes/threads to be executed are not found within the process/thread map at a correct position in the hierarchy specified in the process/thread map, then refraining from executing the application.

9. The system as in claim 8 wherein if the processes/threads to be executed are not found within the process/thread map at a correct position in the hierarchy specified in the process/thread map, then rebooting a computer on which the application is attempting to be executed.

10. The system as in claim 8 further comprising program code to perform the operations of:
executing a virtual machine on which the application is to be executed, the virtual machine including a virtual file system, the system further comprising program code for redirecting file and registry requests of the application to a virtual location in the virtual file system.

11. The system as in claim 10 further comprising program code to perform the operations of:
determining whether any open handles exist prior to executing the application; and
only executing the application if no open handles exist.

12. The system as in claim 8 wherein installing the application comprises:
storing application binaries and registry entries for the application within an encrypted container; and
loading the container into memory and decrypting the container only if the processes/threads to be executed are found within the process/thread map at a correct position in the hierarchy specified in the process/thread map.

13. The system as in claim 8 wherein the process/thread map further includes contextual information such that different maps can be derived for use in different contexts.

14. The system as in claim 8 further comprising program code to perform the operations of:
receiving a request during system runtime to switch the process/thread map that are allowed to execute; and
responsively switching the process/thread map with a new process/thread map.

15. A machine-readable medium for securely loading application program code in an application hosting service, the machine-readable medium having program code stored thereon which, when executed by a machine, causes the machine to perform the operations of:
installing an application on the application hosting service;
generating a process/thread map of processes/threads included in the application, the map including an identification of each process/thread and the hierarchical relationships between the processes/threads;
receiving a request to execute processes/threads of an application;
comparing the processes/threads to be executed with the process map to determine whether each process/thread to be executed is included in the map and that each process/thread is to be executed at a correct position in the hierarchy; and
executing the processes/threads of the application if the processes/threads to be executed are found within the process/thread map at a correct position in the hierarchy specified in the process/thread map; and
if the processes/threads to be executed are not found within the process/thread map at a correct position in the hierarchy specified in the process/thread map, then refraining from executing the application.

16. The machine-readable medium as in claim 15 wherein if the processes/threads to be executed are not found within the process/thread map at a correct position in the hierarchy specified in the process/thread map, then rebooting a computer on which the application is attempting to be executed.

17. The machine-readable medium as in claim 15 further comprising program code to perform the operations of:
executing a virtual machine on which the application is to be executed, the virtual machine including a virtual file system, the machine-readable medium further comprising program code for redirecting file and registry requests of the application to a virtual location in the virtual file system.

18. The machine-readable medium as in claim 17 further comprising program code to perform the operations of:
determining whether any open handles exist prior to executing the application; and
only executing the application if no open handles exist.

19. The machine-readable medium as in claim 15 wherein installing the application comprises:
storing application binaries and registry entries for the application within an encrypted container; and
loading the container into memory and decrypting the container only if the processes/threads to be executed are found within the process/thread map at a correct position in the hierarchy specified in the process/thread map.

20. The machine-readable medium as in claim 15 wherein the process/thread map further includes contextual information such that different maps can be derived for use in different contexts.

21. The machine-readable medium as in claim 15 further comprising program code to perform the operations of:
receiving a request during system runtime to switch the process/thread map that are allowed to execute; and
responsively switching the process/thread map with a new process/thread map.

* * * * *